United States Patent [19]

Nakagawa

[11] 4,329,038
[45] May 11, 1982

[54] AUTOMATIC FOCUSING CAMERA EQUIPPED WITH SELF-TIMER

[75] Inventor: Tadashi Nakagawa, Yotsukaido, Japan

[73] Assignee: Seiko Koki Kabushiki Kaisha, Tokyo, Japan

[21] Appl. No.: 183,033

[22] Filed: Sep. 2, 1980

[30] Foreign Application Priority Data

Sep. 3, 1979 [JP] Japan .................. 54/112550

[51] Int. Cl.³ .............. G03B 13/20; G03B 17/40
[52] U.S. Cl. .................. 354/195; 354/237; 354/268
[58] Field of Search .............. 354/25, 195–201, 354/268, 237–240; 352/140

[56] References Cited

FOREIGN PATENT DOCUMENTS 54-115222 9/1979 Japan .................. 354/25

Primary Examiner—George H. Miller, Jr.
Assistant Examiner—William B. Perkey
Attorney, Agent, or Firm—Robert E. Burns; Emmanuel J. Lobato; Bruce L. Adams

[57] ABSTRACT

An automatic focusing camera automatically determines the focus position of the taking lens by detecting the distance between the camera and an object and equipped with a self-timer setting system and a focusing system selector system which selects between automatic focusing and manual focusing.

A shutter locking member which normally locks the shutter interlocking with a setting operation of said self-timer setting system is released as said focusing system reflector system is set to manual focusing.

3 Claims, 1 Drawing Figure

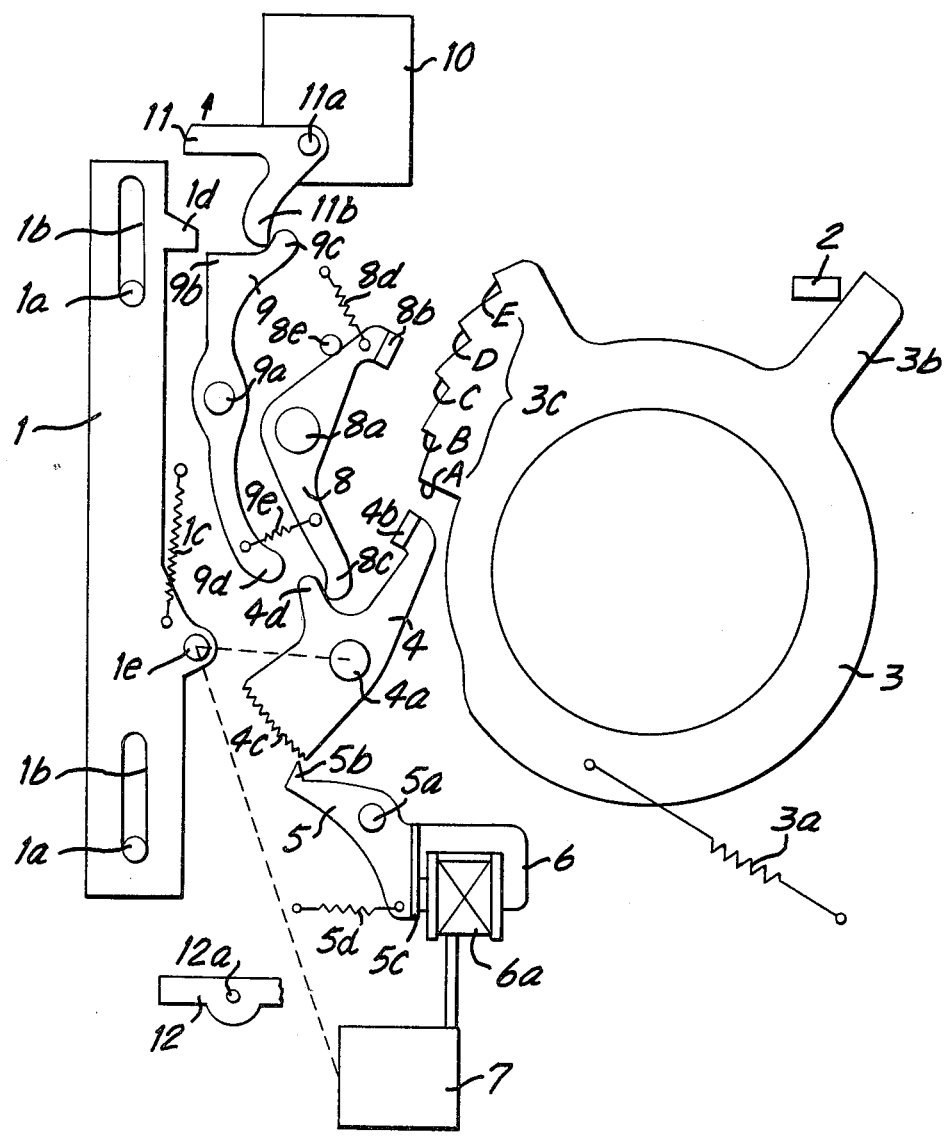

AUTOMATIC FOCUSING CAMERA EQUIPPED WITH SELF-TIMER

BACKGROUND OF THE INVENTION

This invention relates to an improvement of an automatic focusing camera and more particularly to an improvement of an automatic focusing camera equipped with a self-timer.

The automatic focusing camera capable of automatically focusing the photograph taking lens, or simply the taking lens by detecting the distance between the camera and an object and generating an electric signal to set the taking lens at a focus position has been widely accepted by photographers owing to its intrinsic ease of operation. However, the conventional automatic focusing cameras have problems in taking a photograph of the photographer himself using a self-timer. In a camera which focuses the taking lense at the moment when the self-timer is started, the range will be incorrectly set if the photographer starts the self-timer standing immediately in front of or behind the camera, while in a camera which focuses the taking lens after the self-timer has been started, the object may not be within the focus detecting area so that the taking lens will be incorrectly focused.

Accordingly, an object of the present invention is to provide a system which will allow manual focusing in photographing using a self-timer by locking the shutter once when the self-timer is set, then cancelling the locking of the shutter when the automatic focusing is cancelled.

BRIEF DESCRIPTION OF THE DRAWING

The attached drawing is a schematic illustration of the essential part of the mechanism according to the present invention as adjusted in the charged state with the self-timer not in use. Reference numerals designate; 1 . . . release plate, 2 . . . setting plate.

DETAILED DESCRIPTION OF THE INVENTION

Detailed explanation will be made hereinafter referring to the drawing. A release plate 1 having a projection 1d and an interlocking pin 1e is slidably guided by pins 1a fitted in slots 1b and restrained against a spring 1c.

A setting plate 2, only a part of it is shown, is adapted to move leftward from the charged position as shown in the drawing in focusing operation.

A ring 3 having a projection 3b for engaging with the setting plate 2 and cam part 3c formed of cams A, B, C, D and E is rotative together with the taking lens about the optical axis and urged counterclockwise by a spring 3a.

An adjusting lever 4 having a bend 4b for engaging with the cam part 3c, ratchet teeth 4c and an operating arm 4d is rotative about a shaft 4a and interlocked with the interlocking pin 1e by a known means.

An armature lever 5 having a pawl 5b for engaging with the ratchet teeth 4c and a magnetic part 5c is rotative about a shaft 5a and urged clockwise by a spring 5d. In the charged state as shown in the drawing, the armature lever 5 is pressed against an electromagnet 6 against the spring 5d by a known means.

The coil 6a of the electromagnet 6 is connected to a focus detecting electronic circuit 7 which supplies electricity to the coil 6a after the interlocking pin 1e has started and cuts off electricity when the focus is determined by the operation of the interlocking pin 1e.

A selecting member 8 having a bend 8b for engaging with the cam part 3c and an arm 8c for engaging with the operating arm 4d is rotative about a shaft 8a, urged counterclockwise by a spring 8d and stopped by a fixed pin 8e.

A locking member 9 having a shoulder part 9b for engaging with the projection 1d and projections 9c and 9d is rotative about a shaft 9a and urged counterclockwise by a weak spring 9e extending between the locking member 9 and the selecting member 8.

A self-timer 10 is set by turning a setting member 11 about a shaft 11a in the direction as shown by the arrow and delays shutter release for a desired period of time by known means. A projection 11b of the setting member 11 pushes the projection 9c against the spring 9e to retract the shoulder part 9b from the operating range of the projection 1d when the self-timer is not used.

A release lever 12 is rotative about a shaft 12a and adapted to actuate the shutter, not shown.

The manner of operation of the mechanism with the self-timer resting will be explained.

As the release plate 1 is depressed against the spring 1c interlocking with shutter release operation, the interlocking pin 1e actuates the focus detecting electronic circuit 7 to supply electricity to the coil 6a and to magnetize the electromagnet 6 so that the armature lever 5 is attracted to and held by the electromagnet 6, then the pressing of the armature lever 5 against the electromagnet is released by a known means, not shown, so that the armature lever 5 is controlled by the attraction of the electromagnet 6.

At the same time, the interlocking pin 1e turns the adjusting lever 4 counterclockwise about the shaft 4a, during which electricity supply to the coil 6a is cut off to unmagnetize the electromagnet 6 when a focus detection signal is generated so that the armature lever 5 is allowed to be turned clockwise about the shaft 5a by the spring 5d. Consequently, the pawl 5b engages with one of the ratchet teeth 4c to hold the bend 4b at a position to engage with one of the cams A, B, C, D and E corresponding to the focus position of the taking lens.

As the release plate 1 is depressed further, the release lever 12 is pushed with the bottom end of the release plate 1 and turned counterclockwise about the shaft 12a to start the shutter.

According to the operation of the shutter, the setting plate 2 travels leftward and is followed by the projection 3b so that the ring 3 is turned counterclockwise together with the taking lens by the spring 3a until the cam of the cam part 3c corresponding to the focus position of the taking lens is engaged with the bend 4b. Thus the ring 3, that is the taking lens, is adjusted to the focus position.

At the end of the operation of the setting plate 2, the shutter is released to perform exposure and the release plate 1 is returned to the starting position as shown in the drawing by the spring 1c.

In recharging the shutter, the setting plate 2 is moved rightward interlocking with the shutter charging operation pushing the ring 3 at the projection 3b against the spring 3a to turn the ring 3 clockwise and at the same time, turning the armature lever 5 counterclockwise against the spring 5d so that the magnetic part 5c is pressed against the electromagnet 6 thus completing the recharging operation as shown in the drawing.

When the self-timer is used, as the setting member 11 is turned clockwise about the shaft 11a, the locking member 9 is turned counterclockwise about the shaft 9a by the spring 9e as the projection 9c follows the projection 11b so that the shoulder part 9b is brought into the operating area of the projection 1d. The turning of the locking member 9 stops with the arm 9d against the arm 8c of the selecting member 8. In this state, the shoulder part 9d obstructs the operation of the release plate 1 by engaging with the projection 1d of the release plate 1.

Then, as the selecting member 8 is manually turned clockwise about the shaft 8a against the spring 8d, the arm 8c is engaged with the operating arm 4d to turn the adjusting lever 4 counterclockwise about the shaft 4a so that the bend 4b is retracted out of the operating range of the cam E of the cam part 3c while the bend 8b is introduced into the operating range of the cam D of the ring 3. The cam D corresponds to the common focus position of the taking lens.

Meanwhile, the arm 8c pushes the arm 9d to turn the locking member 9 clockwise so that the shoulder part 9b is retracted from the operating area of the projection 1d.

When the release plate 1 is depressed with the self-timer setting member 11 set at the self-timer operating position and the selecting member 8 set at the common focus position, the adjusting lever 4 will not be controlled by the focus signal generated from the electronic circuit 7 if the armature lever 5 is controlled by the electronic circuit 7 actuated by the interlocking pin 1e, because the adjusting lever 4 has previously been turned counterclockwise by the arm 8c of the selecting member 8 and the bend 4b has been retracted from the operating range of the cam part 3c. Therefore, the cam D corresponding to the common focus position of the taking lens engages with the bend 8b and the taking lens is adjusted to the common focus position when the setting plate 2 is actuated by the release lever 12 and the ring 3 is turned counterclockwise.

The operation of the setting plate 2 is delayed by the self-timer 10 through a means, not shown, near the end of the operation and allowed to move the final position after a fixed period of time to actuate the shutter thus completing the exposure, then the setting member 11 returns to the position as shown in the drawing.

In modification, the self-timer 10 may be constructed to allow the setting plate 2 to move a fixed period of time after the release lever 12 has been actuated.

Furthermore, although the selecting member 8 is provided with an action to cancel the automatic focusing function of the adjusting lever 4 and an action to restrain the cam part 3c at the position corresponding to the common focus position of the taking lens, the latter action may be developed into an action to adjust the cam part 3c to plural manually adjusted focus positions.

Still further, the selecting member 8 may be constructed to cancel the automatic focus detecting function of the electronic circuit 7 instead of a function of the arm 8c and to provide manual focus detecting function to the electronic circuit 7 instead of the bend 8b thus adjusting the adjusting lever 4 to a manually adjusted focus position.

According to the present invention, when the self-timer is used, the photographer is warned that the automatic focusing is not available by obstructing the shutter release operation and shutter release operation is possible by adjusting the mechanism to manual focusing setting. Thus the present invention is useful for the correct operation of the automatic focusing camera and for extending the availability of the automatic focusing camera.

What is claimed:

1. In an automatic focusing camera having an automatic focusing mechanism for automatically focusing the camera by detecting a distance between the camera and an object to be photographed, the combination comprising: a self-timer for controlling camera operation, said self-timer having a setting member movable between a position where said self-timer is inoperative and a position where said self-timer is operative; selecting means for selecting between an automatic focusing mode and a manual focusing mode; a manually operable shutter release member; and locking means actuated by said setting member for locking said shutter release member when said self-timer is actuated and said selecting means is selecting the automatic focusing mode and deactuated by said selecting means when said selecting means is selecting the manual focusing mode for releasing said shutter release member to permit shutter operation under control of said self-timer in the manual focusing mode.

2. In an automatic focusing camera according to claim 1, wherein: said automatic focusing mechanism comprises a focusing ring rotatable to different angular positions each corresponding to a different focus distance; and said selecting means is comprised of a first lever manually rotatable for engaging said focusing ring to set the angular position of said focusing ring.

3. In an automatic focusing camera according to claim 2, wherein: said locking means is comprised of a second lever mounted for rotation, said second lever having an end portion engaged by said self-timer setting member when said self-timer is inoperative for holding said second lever in an inoperative position, said second lever having means for engaging said shutter release member when said self-timer setting member releases said second lever to rotate to an operative position, and said second lever having another end portion engaged by said first lever to rotate said second lever back to an inoperative position when said first lever pivots to engage said focusing ring.

* * * * *